United States Patent
Albero et al.

(10) Patent No.: US 12,266,232 B2
(45) Date of Patent: Apr. 1, 2025

(54) USER AUTHENTICATION USING BEHAVIOR PATTERNS

(71) Applicant: Bank of America Corporation, Charlotte, NC (US)

(72) Inventors: George Albero, Charlotte, NC (US); Amit Pandey, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/872,569

(22) Filed: Jul. 25, 2022

(65) Prior Publication Data

US 2024/0029490 A1 Jan. 25, 2024

(51) Int. Cl.
| | | |
|---|---|---|
| G07C 9/20 | (2020.01) | |
| G06F 18/23 | (2023.01) | |
| G06K 19/07 | (2006.01) | |
| G06N 20/00 | (2019.01) | |
| G06Q 20/40 | (2012.01) | |
| G07C 9/00 | (2020.01) | |

(52) U.S. Cl.
CPC .............. *G07C 9/20* (2020.01); *G06F 18/23* (2023.01); *G06K 19/0723* (2013.01); *G06N 20/00* (2019.01); *G06Q 20/4015* (2020.05); *G07C 9/00571* (2013.01)

(58) Field of Classification Search
CPC .............................. G07C 9/20; G07C 9/00571
See application file for complete search history.

(56) References Cited

U.S. PATENT DOCUMENTS

| | | | |
|---|---|---|---|
| 8,312,157 B2 | 11/2012 | Jakobsson et al. | |
| 9,251,633 B2 * | 2/2016 | Libal | G06F 9/542 |
| 9,984,218 B2 | 5/2018 | Liu et al. | |
| 10,108,791 B1 | 10/2018 | Masterman | |
| 10,341,391 B1 | 7/2019 | Pandey et al. | |
| 10,380,813 B1 * | 8/2019 | Edwards | G06F 3/017 |
| 11,348,395 B2 * | 5/2022 | Campbell | H04L 63/104 |
| 2017/0227995 A1 | 8/2017 | Lee et al. | |
| 2017/0236347 A1 * | 8/2017 | Drako | G07C 9/23 |
| | | | 340/5.33 |
| 2017/0357977 A1 | 12/2017 | Pitz et al. | |
| 2019/0073457 A1 | 3/2019 | Jiang et al. | |
| 2020/0226605 A1 | 7/2020 | Walters et al. | |
| 2020/0349786 A1 * | 11/2020 | Ho | G06V 40/172 |
| 2021/0221331 A1 * | 7/2021 | Lechner | B60R 25/245 |

FOREIGN PATENT DOCUMENTS

| | | |
|---|---|---|
| CN | 102036163 B | 7/2014 |
| CN | 103646197 B | 6/2016 |
| EP | 3437004 B1 | 2/2021 |
| KR | 100847532 B1 | 7/2008 |
| KR | 101767454 B1 | 8/2017 |
| WO | 2017071126 A1 | 5/2017 |

* cited by examiner

*Primary Examiner* — Nabil H Syed

(74) *Attorney, Agent, or Firm* — Banner & Witcoff, Ltd.

(57) ABSTRACT

Systems, devices, and methods for user authentication are described. A security platform may authenticate a user based on a machine learning model created using historical user behavior. The user behavior may correspond to user interaction with and/or operation of a computing device. The user behavior may correspond to, for example, historical user purchase patterns. Applications include user authentication for online and offline purchases, access to computing resources, and/or access to physical locations.

17 Claims, 9 Drawing Sheets

USER AUTHENTICATION USING BEHAVIOR PATTERNS

FIELD

Aspects described herein generally relate to the field of user authentication, and more specifically to using behavioral patterns for user authentication.

BACKGROUND

A common technical issue across multiple sectors is that of authenticating a user to verify a user identity. For example, an employee accessing an office building or computing resources of an organization needs to be authenticated to ensure that the user is authorized for entry. As another example, a user using a debit card for an online purchase is often verified using two-factor authentication to ensure that the transaction is authorized. Most authentication mechanisms use either a physical object (e.g., identification card, radio frequency (RF) tag) and/or a secret code (e.g., password, passcode) for user authentication, each of which have drawbacks.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that for user authentication. For example, the methods, devices, and systems described herein describe usage of behavioral patterns for user authentication. Application areas include online/offline purchases, access control systems, etc.

In accordance with one or more arrangements, a system may comprise a user device and an authentication platform in communication with the user device. The user device may comprise one or more sensors. The authentication platform may comprise at least one processor; and memory storing computer-readable instructions that, when executed by the at least one processor, cause the authentication platform to perform one or more operations. The authentication platform may receive, from the user device, first operation metrics measured in a first time period by the one or more sensors. Thereafter, the authentication platform may perform cluster analysis on the first operation metrics to determine groups of normal operation metrics corresponding to historical operation of the user device. Following which, the authentication platform may receive an authorization request for the online transaction. The online transaction may be a payment transaction using a card (e.g., a debit card or a credit card). The authentication platform may send, to the user device, a request for second operation metrics for the user device. The authentication platform may receive, from the user device, second operation metrics measured in a second time period by the one or more sensors. The authentication platform may determine, based on the groups of normal operation metrics, that the second operation metrics are anomalous and, based on the determining, send a notification denying the authorization request.

In some arrangements, the first operation metrics may comprise one or more of: an angle of the user device with respect to ground; an indication of whether the user device is being held with a left hand or a right hand; a typing speed at an interface of the user device; a web browser history of the user device; or an application usage history of the user device. In some arrangements, the first operation metrics may be determined intermittently by the user device.

In some arrangements, the authentication platform may receive the authorization request from a payment processor server, and send the notification to the payment processor server.

In some arrangements, the second time period may be time period immediately preceding the receiving of the authorization request. The second time period may be smaller than the first time period.

In some arrangements, the payment transaction may be initiated via the user device.

In some arrangements, the one or more sensors may comprise one or more of: a gyroscope; an accelerometer; or a camera.

In some arrangements, the authentication platform may determine that the second operation metrics are anomalous based on determining that distances between the second operation metrics and core points associated with the groups are greater than a threshold value.

In accordance with one or more arrangements, a system may comprise a sensor configured to wirelessly scan an access card, an actuator controlling a locking mechanism, and an authentication platform. The authentication platform may comprise at least one processor; and memory storing computer-readable instructions that, when executed by the at least one processor, cause the authentication platform to perform one or more operations. The authentication platform may receive, from the sensor, first usage patterns of the access card. The first usage patterns may correspond to historical use of the access card. The authentication platform may perform cluster analysis on the first usage patterns to determine groups of normal usage patterns. The authentication platform may receive, from the sensor, an access request. The access request may be for entry into a location secured by the locking mechanism and may comprise a second usage pattern. The authentication platform may determine, based on the groups of normal usage patterns, that the second usage pattern is non-anomalous. Based on the determining that the second usage pattern is non-anomalous. The authentication platform may send an indication to activate the actuator, wherein the indication to activate the actuator causes the locking mechanism to release.

In some arrangements, the first usage patterns may comprise one or more of: motion patterns of an access card; or received signal strengths as measured by the sensor.

In some arrangements, the sensor may be one of a camera or a motion sensor.

In some arrangements, the access card may store an access code. The authentication platform may send the indication to activate the actuator based on the access code being an authorized access code. The system may further comprise a radio frequency identification (RFID) sensor configured to scan the access card to determine the access code.

In some arrangements, the authentication platform may determine that the second usage pattern is non-anomalous based on determining that distances between the second usage pattern and core points associated with the groups are less than a threshold value.

In some arrangements, the authentication platform may perform the cluster analysis using a clustering algorithm. The clustering algorithm may comprise one or more of hierarchical clustering, centroid based clustering, density based clustering, or distribution based clustering.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Traditional authentication mechanisms (e.g., password, RF tag, etc.) may not cover all aspects of user protection. For example, a smartphone may be stolen and may be used to initiate unauthorized purchases online. Many smartphone applications for online purchases do not need a user to enter a password for a purchase, and/or may store user credit card information that can be automatically applied to a purchase. While this benefits user experience, it has the drawback of allowing a malicious actor with access to that smartphone to make online purchases. Similarly, credit card-based at brick-and-mortar stores generally do not require any additional authorization prior to initiating a purchase. As such, a stolen credit card may be easily used.

Various examples herein describe methods, devices, and systems for user authentication using behavior patterns. Sensors (e.g., cameras, motion sensors, etc.) may be used to quantify a user behavior and determine whether user behavior matches historical user behavior for an authorized user. The technique is applied in conjunction with machine learning algorithms to determine outliers in user behavior. If user behavior is an outlier/anomalous with respect to historical user behavior (e.g., associated with an authorized user, or other users of a financial/banking enterprise), user request may be declined. The user request may correspond to different scenarios. The user request may be for an online or offline card-based transaction. The user request may be for access into a physical location. The user request may be for access to enterprise computing resources of an enterprise organization.

Figure 1A:
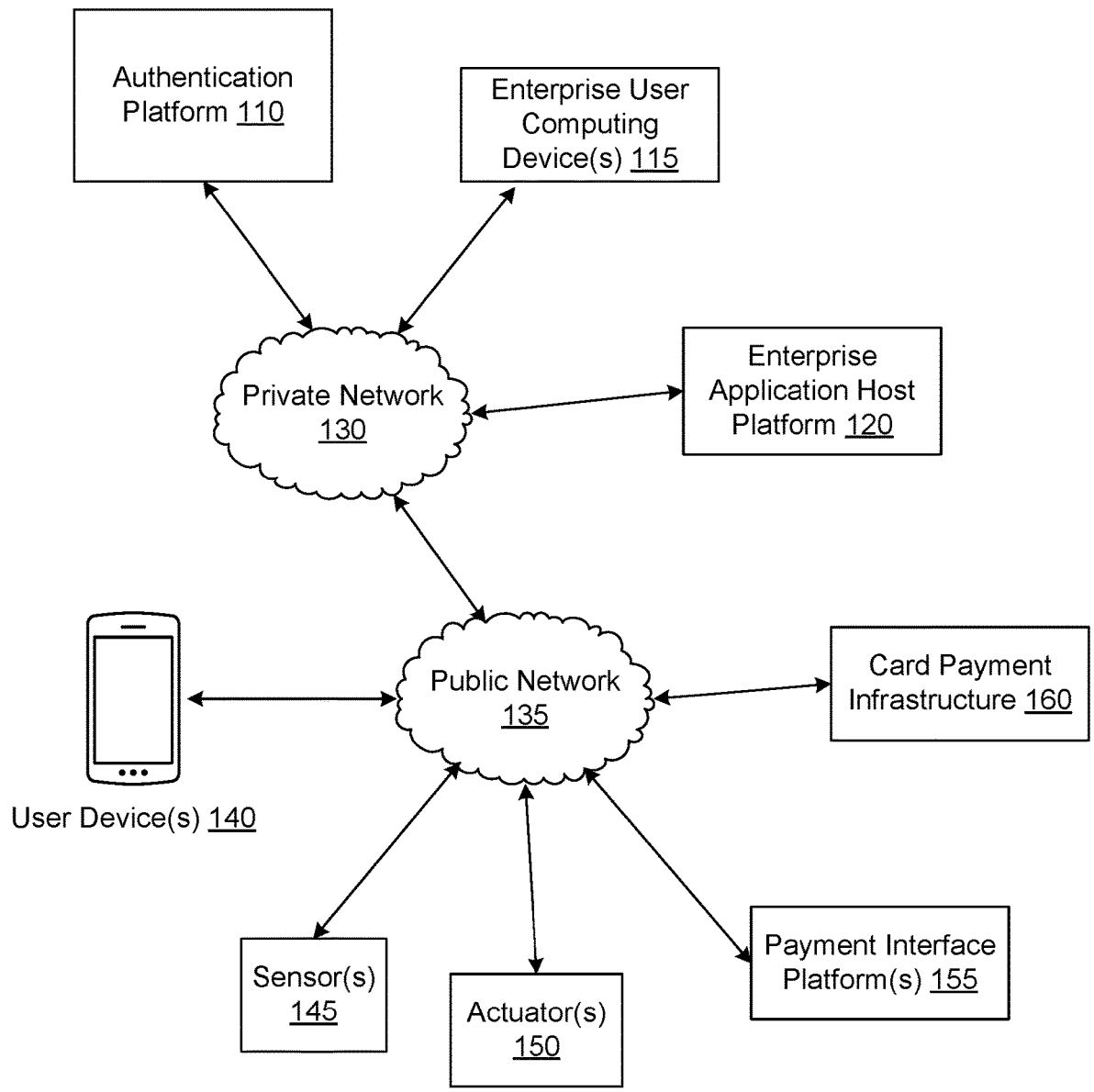
FIG. 1A shows an illustrative computing environment in which an authentication system, in accordance with one or more example arrangements.

FIG. 1A shows an illustrative computing environment 100 in which an authentication system may be deployed, in accordance with one or more arrangements. The computing environment 100 may comprise one or more devices (e.g., computer systems, communication devices, and the like). The computing environment 100 may comprise, for example, an authentication platform 110, an enterprise application host platform 120, and/or one or more enterprise user computing devices 115. The one or more of the devices and/or systems, may be linked over a private network 130. In an arrangement, the private network 130 may be associated with an enterprise organization (e.g., a bank/financial institution). For example, the private network 130 may correspond to a network associated with an issuing bank of a payment card (e.g., credit card, debit card). The payment card may be issued to an authorized user for initiating transactions. In an arrangement, the private network 130 may be associated with a vendor providing authentication services for enterprise clients.

The computing environment 100 may additionally comprise one or more external devices/systems connected, via a public network 135, to the devices in the private network 130. For example, the public network 135 may comprise user device(s) 140, card payment infrastructure 160, payment interface platforms 155, sensors 145, and actuators 150, card payment infrastructure 160.

The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and the like).

In an arrangement, one or more device of the public network 135 may function as a system to process card-based transactions. For example, a payment interface platform 155 may be used to initiate card-based transactions (e.g., online purchases, payments, fund transfers, etc.). A payment interface platform 155 may be, for example, a point-of-sale device (PoS) at a physical retail location or may be a user computing device (e.g., a smartphone, a desktop/laptop computer, a wearable device, etc.). For example, the payment interface platform(s) 155 may comprise servers/computing devices providing a payment interface via a web page associated with an online merchant. The payment interface may be used to initiate a card-based payment transaction. As another example, the payment interface platform(s) 155 may comprise card reader devices (e.g., at brick and mortar stores) that may be used to scan/read credit/debit cards and process a payment transaction. The card payment infrastructure 160 may comprise one or more payment gateway platforms, payment processor platform(s) and/or card network platform(s) for processing the card-based transaction.

In an arrangement, one or more devices of the public network 135 may function as a system to control user access (e.g., to a physical location, networked computing resources, etc.). With respect to access control to a physical location, the sensors 145 may comprise near-field communication (NFC) sensors, and/or radio frequency identification (RFID) sensors to wirelessly scan access cards and determine whether the access card are valid for entry into a physical location. The actuator 150 may, based on receiving input that an access card is valid for entry, grant user access to the physical location.

The authentication platform 110 may comprise one or more computing devices and/or other computer components (e.g., processors, memories, communication interfaces) configured to perform one or more functions as described herein. For example, the authentication platform 110 may comprise one or more computers (e.g., laptop computers, desktop computers, servers, server blades, or the like). As described herein, the authentication platform 110 may authenticate a user for various applications. The authentication platform 110 may authenticate a user based on machine-learning supported behavioral analysis. Applications may include authentication of card-based transactions, controlling entry to physical locations, controlling access to computing resources, and/or any other applications that require user authentication.

The enterprise application host platform 120 may comprise one or more computing devices and/or other computer components (e.g., processors, memories, communication interfaces). In addition, the enterprise application host platform 120 may be configured to host, execute, and/or otherwise provide one or more enterprise applications. In an arrangement where the private network 130 is associated with a banking/financial organization, the enterprise application host platform 120 may be configured, for example, to host, execute, and/or otherwise provide one or more transaction processing programs, such as online banking applications, fund transfer applications, data transmission applications, and/or other programs associated with the financial institution. The enterprise application host platform 120 may comprise various servers and/or databases that store and/or otherwise maintain account information, such as financial account information including account balances, transaction history, account owner information, and/or other information. In addition, the enterprise application host platform 120 may process and/or otherwise execute transactions on specific accounts based on commands and/or other information received from other computer systems comprising the computing environment 100.

For example, the enterprise application host platform 120 may determine available funds in a user account associated with a debit card, or an available credit corresponding to a credit card (e.g., as described at step 756). Based the determining, the enterprise application host platform 720 may initiate a card-based payment transaction (e.g., fund transfer to a recipient account), or send a notification to one or more platforms in the computing environment 100 indicating that the transaction may be approved.

In other arrangements, the private network 130 may be associated with an organization providing authentication services, and the enterprise application host platform 120 may host, execute, and/or otherwise provide one or more enterprise applications for developing, testing, and maintaining authentication applications and systems.

The enterprise user computing device(s) 115 and/or the user device(s) 140 may be personal computing devices (e.g., desktop computers, laptop computers) or mobile computing devices (e.g., smartphones, tablets). The enterprise user computing device(s) 115 may be linked to and/or operated by specific enterprise users (who may, for example, be employees or other affiliates of the enterprise organization). The user device(s) 140 may be linked to and/or operated by clients associated with the enterprise organization (e.g., who may have been issued payment cards, such as credit or debit cards). In an arrangement, the user device(s) 140 may be used to request a credit/debit card transaction via a web-based payment interface (e.g., an online payment portal, a merchant website).

The payment interface platform 155 may comprise various computing systems and networks for initiating a card-based payment transaction. For example, may comprise one or more computing devices and/or other computer components (e.g., processors, memories, communication interfaces) for providing a web-based payment interface to a user of a computing device (e.g., the user device 140). The web-based payment interface may be used to input card details, which may then be sent to the card payment infrastructure 160 for processing. In another arrangement, the payment interface platform 155 may be a point-of-sale (PoS) device (e.g., at a physical location) where a user may swipe or insert a card to initiate a card-based payment transaction. The PoS device may then send the card details to the card payment infrastructure.

The card payment infrastructure 160 may comprise various computing systems and networks for processing card-based transactions. The card payment infrastructure 160 may comprise one or more computing devices and/or other computer components (e.g., processors, memories, communication interfaces). The card payment infrastructure 160 may comprise systems, networks, and applications that perform various functions associated with processing a card-based transaction. For example, the card payment infrastructure 160 may facilitate transmission of transaction data (e.g., transaction details, authorization responses, etc.) between payment interfaces (e.g., the payment interface platform 155) and bank networks.

The card payment infrastructure 160 may comprise systems, networks, and applications associated with one or more payment gateways, payment processors, and/or card networks (e.g., card associations). A payment gateway may receive transaction details (e.g., from the payment interface platform 155), associated with a payment transaction that uses a card, and forward the transaction details to the payment processor. A payment processor may maintain connections with multiple different card networks. The payment processor may forward transaction details to a card network corresponding to the card. The card network may communicate with an issuing bank of the card to validate and process a transaction.

The actuators 150 may correspond to locking mechanisms associated with doors and/or vaults located at the physical locations (e.g., at an enterprise locations) for access control. The one or more actuators 150 may cause the locking mechanisms to engage or disengage based on signals received from the authentication platform 110 as further described herein.

The sensors 145 may correspond to devices that may be used to scan an authentication device (e.g., an RFID/NFC enabled-card) to control entry into a physical location. In an arrangement, the sensors 145 may comprise one or more cameras to capture videos of a card being held/moved across the authentication device. The sensors 145 may then send an authentication code (e.g., as read using RFID/NFC protocol) or a fingerprint, along with a captured video, to the authentication platform 110 for validation.

In one or more arrangements, the authentication platform 110, the enterprise application host platform 120, the enterprise user computing devices 115, the user device(s) 140, the card payment infrastructure 160, and/or other devices/systems in the computing environment 100 may be any type of computing device capable of receiving input, and communicating the received input to one or more other computing devices in the computing environment 100. For example, the authentication platform 110, the enterprise application host platform 120, the enterprise user computing devices 115, the user device(s) 140, the payment processor platform(s) 1250, the card network platform(s) 1245, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the authentication platform 110, the enterprise application host platform 120, the enterprise user computing devices 115, the user device(s) 140, the card payment infrastructure 160, and/or the other devices/systems in the computing environment 100 may, in some instances, be and/or comprise special-purpose computing devices configured to perform specific functions.

Figure 1B:
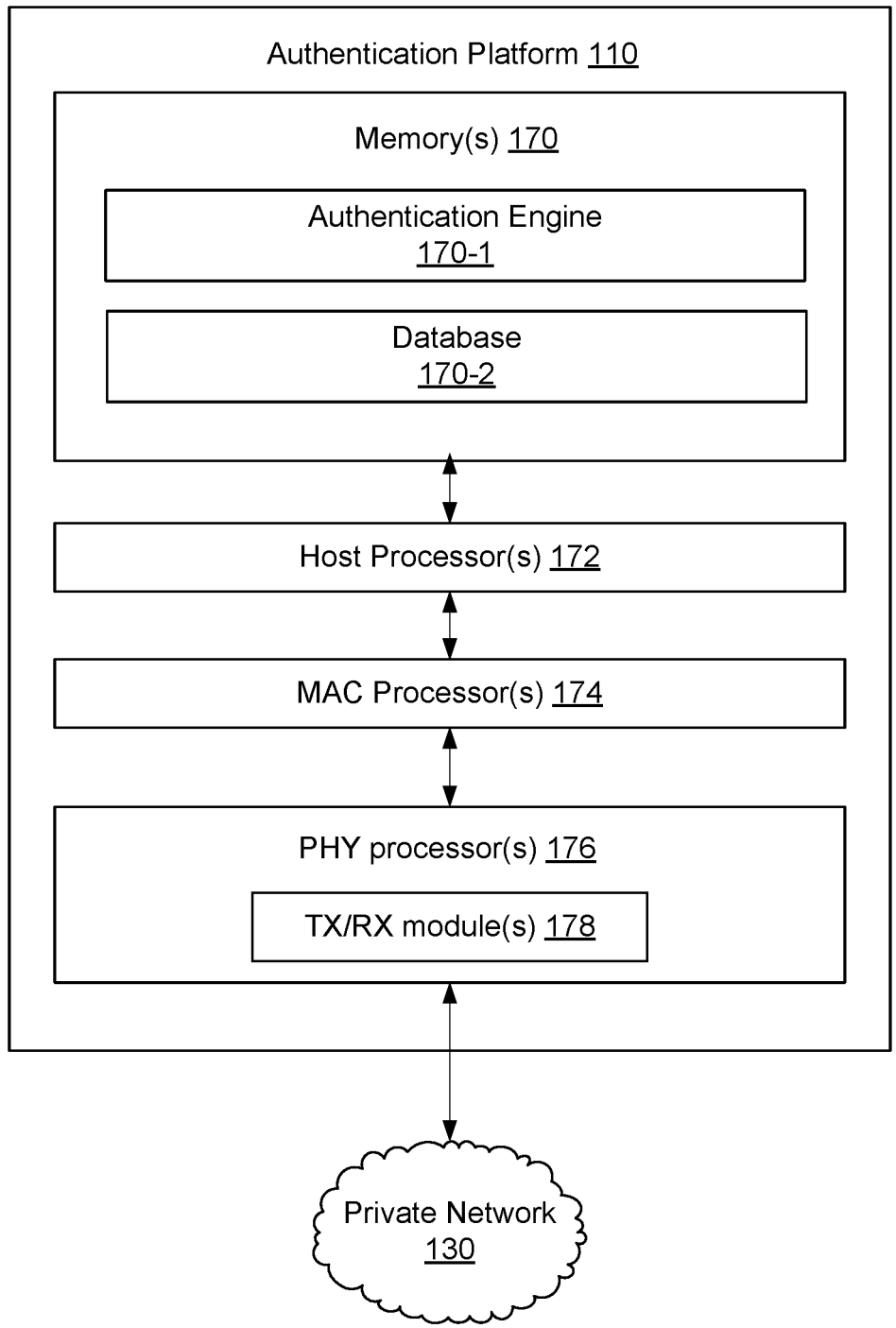
FIG. 1B shows an example authentication platform, in accordance with one or more example arrangements.

FIG. 1B shows an example authentication platform 110, in accordance with one or more examples described herein. The authentication platform 110 may comprise one or more of host processor(s) 172, medium access control (MAC) processor(s) 174, physical layer (PHY) processor(s) 176, transmit/receive (TX/RX) module(s) 178, memory 170, and/or the like. One or more data buses may interconnect host processor(s) 172, MAC processor(s) 174, PHY processor(s) 176, and/or Tx/Rx module(s) 178, and/or memory 170. The authentication platform 110 may be implemented using one or more integrated circuits (ICs), software, or a combination thereof, configured to operate as discussed below. The host processor(s) 172, the MAC processor(s) 174, and the PHY processor(s) 176 may be implemented, at least partially, on a single IC or multiple ICs. Memory 170 may be any memory such as a random-access memory (RAM), a read-only memory (ROM), a flash memory, or any other electronically readable memory, or the like.

Messages transmitted from and received at various devices (e.g., in the computing environment 100) may be encoded in one or more MAC data units and/or PHY data units. The MAC processor(s) 174 and/or the PHY processor(s) 176 of the authentication platform 110 may be configured to generate data units, and process received data units, that conform to any suitable wired and/or wireless communication protocol. For example, the MAC processor(s) 174 may be configured to implement MAC layer functions, and the PHY processor(s) 176 may be configured to implement PHY layer functions corresponding to the communication protocol. The MAC processor(s) 174 may, for example, generate MAC data units (e.g., MAC protocol data units (MPDUs)), and forward the MAC data units to the PHY processor(s) 176. The PHY processor(s) 176 may, for example, generate PHY data units (e.g., PHY protocol data units (PPDUs)) based on the MAC data units. The generated PHY data units may be transmitted via the TX/RX module(s) 178 over the private network 130. Similarly, the PHY processor(s) 176 may receive PHY data units from the TX/RX module(s) 178, extract MAC data units encapsulated within the PHY data units, and forward the extracted MAC data units to the MAC processor(s). The MAC processor(s) 174 may then process the MAC data units as forwarded by the PHY processor(s) 176.

One or more processors (e.g., the host processor(s) 172, the MAC processor(s) 174, the PHY processor(s) 176, and/or the like) of the authentication platform 110 may be configured to execute machine readable instructions stored in memory 170. The memory 170 may comprise one or more program modules/engines having instructions that when executed by the one or more processors cause the authentication platform 110 to perform one or more functions described herein. The one or more program modules/engines and/or databases may be stored by and/or maintained in different memory units of the authentication platform 110 and/or by different computing devices that may form and/or otherwise make up the authentication platform 110. For example, the memory 170 may have, store, and/or comprise an authentication engine 170-1 and/or a database 170-2.

The authentication engine 170-1 may have instructions that direct and/or cause the authentication platform 110 to perform one or more operations relating to authentication as described herein. For example, the authentication engine 170-1 may have instructions for generating a machine learning model of data. If the authentication platform 110 is for validating card-based payment transactions for online purchases being made via the user device 140, the machine learning model may be based on metrics relating to operation of the user device 140, or a purchase history of a user. If the authentication platform 110 is for controlling user access to a physical location, the machine learning model may relate to usage of an access card (e.g., motion of an RFID access card near the sensor 145). If the authentication platform 110 is for controlling user access to networked computing resources via the user device 140, the machine learning model may be based on metrics relating to operation of the user device 140. The authentication engine 170-1 may further have instructions to authenticate, using the generated machine learning model, data as received from the sensors 145 and/or the user device 140. The database may be used to store data for generating a machine learning model of data to be authenticated. For example, the data may comprise historical data as received from the sensors 145 and/or user devices 140.

The authentication engine 150-2 may receive data and, using one or more machine learning algorithms, may generate one or more machine learning datasets (e.g., machine learning models). Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. As further described herein, the machine learning algorithms and generated models may be used for determining anomalies in measured sensor data, user device operation data, or any other type of data that may be used for user authentication. Various examples herein describe the user of clustering algorithms for generating machine learning models used for user authentication, but any type of machine learning algorithms that are applicable for detection of anomalous data/measurements may be used instead of or in combination with the clustering algorithm.

While FIG. 1A illustrates the authentication platform 110, the enterprise user computing device(s) 115, and the enterprise application host platform 120, as being separate elements connected in the network 130, in one or more other arrangements, functions of one or more of the above may be integrated in a single device/network of devices. For example, elements in the authentication platform 110 (e.g., host processor(s) 172, memory(s) 170, MAC processor(s) 174, PHY processor(s) 176, TX/RX module(s) 178, and/or one or more program/modules stored in memory(s) 170) may share hardware and software elements with and corresponding to, for example, the enterprise application host platform 120 and/or the enterprise user computing devices 115.

Figure 2:
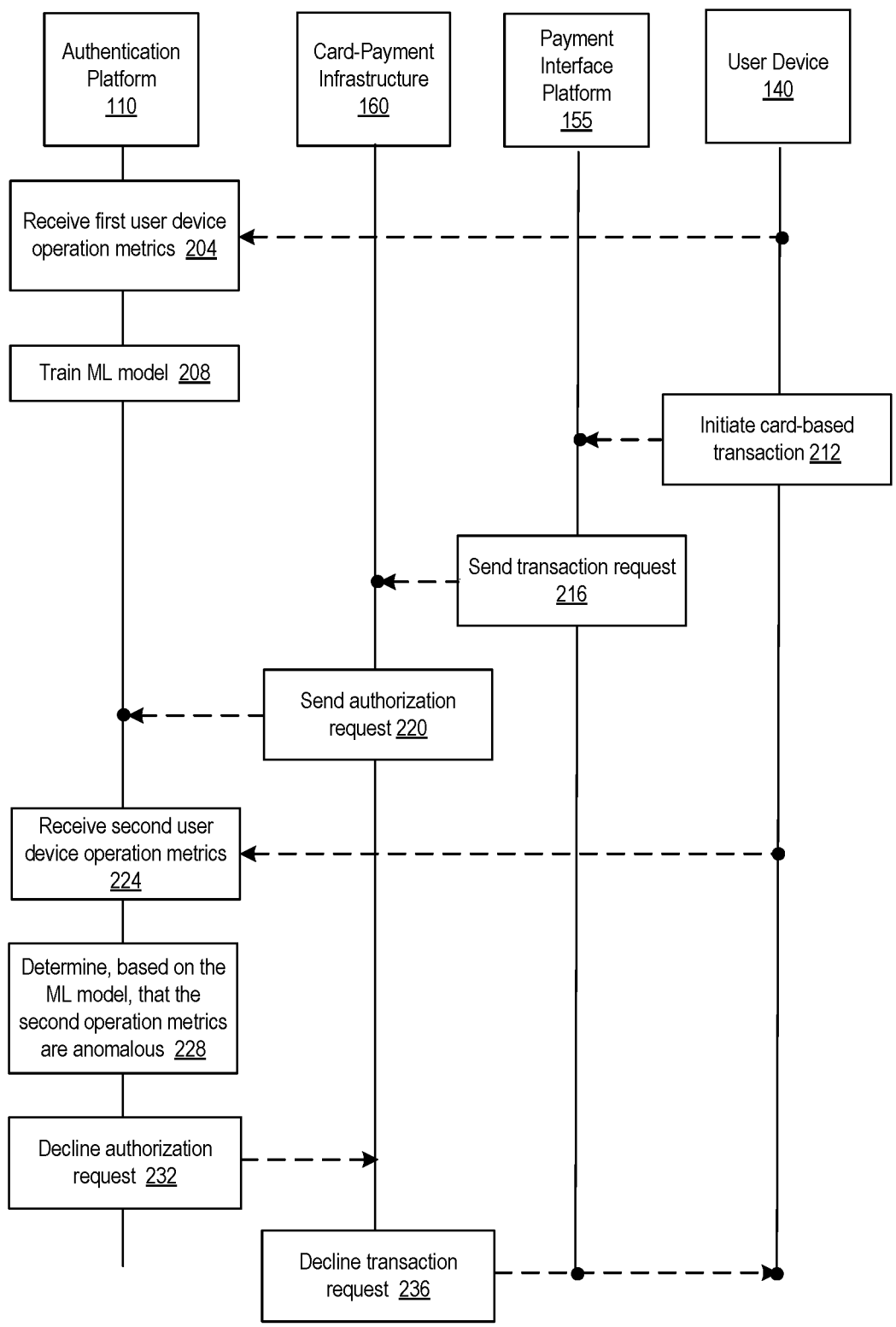
FIG. 2 shows an illustrative event sequence for authenticating a card-based transaction, in accordance with one or more example arrangements.

FIG. 2 shows an illustrative event sequence for authenticating an online payment. The online payment may be a credit/debit card transaction (e.g., via a payment interface/portal on a website or a smartphone application). With respect to the event sequence of FIG. 2, the authentication platform 110 may be associated with an issuing bank of the credit/debit card. At step 204, the authentication platform 110 may receive, from the user device 140 of a user, first operation metrics of the user device 140. The first operation metrics may comprise one or more of: measurements relating to an angle of the user device 140 with respect to ground, an indication of whether the user device is being held with a left hand or a right hand, a typing speed at an interface (e.g., virtual or physical keyboard of the user device 140), websites visited (e.g., web browser history), smartphone applications used/download, and/or the like. In an arrangement, the measurements relating to an angle of the user device may be determined by gyroscopes and/or accelerometers integrated with the user device 140. In an arrangement, data received from a rear-facing camera may be used to determine whether the user device is being held with a left hand or a right hand (e.g., the camera, due to its location on the user device 140, may be obscured if being held with a right hand, and not obscured if being held with the left hand). Operation metrics may be determined by special purpose software installed on the user device 140 for authentication of online payments. The special purpose software may gather the first user operation metrics. The first operation metrics may correspond to operation metrics measured over a first time period. The first operation metrics may correspond to operation metrics intermittently measured over a first time period (e.g., every few seconds, few minutes, few hours, etc.). The first time period may be an extended time period (e.g., a few/several days, weeks, and/or months).

The authentication platform 110 may use the received first operation metrics as training data for training a machine learning model for identifying anomalous operation metrics. In an arrangement, the training data may be stored in the database 170-2. In an arrangement, the database 170-2 may store operation metrics of user devices corresponding to a plurality of individuals. In an arrangement, the first operation metrics may correspond to data corresponding to user devices of the plurality of individuals (in addition to a user of the user device 140).

At step 208, the authentication platform 110 may train a machine learning model based on the first operation metrics. For example, the authentication platform 110 may use a clustering algorithm to categorize/group the first operation metrics (e.g., received at step 204) into one or more groups. The one or more groups may be categorized as normal operation metrics. The clustering algorithm may comprise one or more of hierarchical clustering, centroid based clustering, density based clustering, and/or distribution based clustering. Grouping of normal measurements may enable the authentication platform 110 to categorize/determine operation metrics that corresponds to general operation of the user device 140 over the first time period as normal and non-anomalous. The machine learning model may be associated with an identifier of the user (e.g., user phone number), user credit/debit card number, and/or the like. The authentication platform 110 may store the machine learning model in the database 170-2.

At step 212, the user may initiate/request a card-based transaction (e.g., credit card/debit card payment to a merchant) at the user device 140 via a payment interface provided by the payment interface platform 155. The user may, for example, input at least some of transaction details for the card-based transaction via the payment interface. The transaction details may comprise/indicate one or more of: a card number, a CVV number, a user name, an expiration date, a transaction amount, a recipient account number, a recipient bank, merchant identifier (ID), merchant category code (MCC), transaction value, etc. The payment interface may be provided via a web page associated with an online merchant, and displayed on the user device 140.

At step 216, the payment interface platform 155 may encrypt and send the transaction details (e.g., as part of a transaction request) to the card payment infrastructure 160. At step 220, and in response to the transaction request, the card payment infrastructure 160 may send an authorization request to the authentication platform 110. The authorization request may comprise the transaction details as received from the payment interface platform 155. The authentication platform 110 may be associated with an issuing bank of the card, and the card payment infrastructure 160 may determine the issuing bank/authentication platform 110 based on the card number included in the transaction details.

At step 224, and in response to receiving the authorization request, the authentication platform 110 may request and receive second operation metrics of the user device 140. The authentication platform 110 may determine the user device 140 (e.g., cell phone number of the user device 140, an identifier of the user device 140), for example, based on the card number received via the authorization request. The authentication platform 110 may store (e.g., in the database 170-2) an association between the card number and the cell phone number/identifier of the user device 140. Based on querying the database 170-2, the authentication platform 110 may determine the user device 140 and request the second operation metrics from the user device 140.

The second operation metrics may comprise one or more of: measurements relating to an angle of the user device 140 with respect to the ground, an indication of whether the user device is being held with a left hand or a right hand, a typing speed at an interface (e.g., virtual or physical keyboard of the user device 140), websites visited, smartphone applications used/download, and/or the like. The second operation metrics may correspond to operation metrics measured over a second time period. The second operation metrics may correspond to operation metrics intermittently measured over a second time period (e.g., every few seconds, few minutes, etc.). The second time period may be a time period that is shorter than the first time period (e.g., a few minutes, hours, days, etc.). The second time period may correspond to a time period immediately preceding the initiation of the card-based transaction (e.g., step 212).

At step 228, the security platform 110 may determine whether the second operation metrics are anomalous with respect to the first operation metrics. The second operation metrics may be determined to be anomalous, for example, if the second operation metrics fall outside the groups determined by the clustering algorithm (e.g., at step 208). For example, the measurement may be determined to be outside the group if the distance(s) between the second operation metrics and core point(s) associated with the group(s) is/are greater than a threshold value. The security platform 110 may retrieve the stored machine learning model (e.g., from the database 170-2) based on the identifier of the user and use to stored machine learning model for the clustering analysis at step 228.

The second operation metrics may be anomalous with respect to the first operation metrics because a user who may have illicitly obtained access to the user device 140 may interact with the user device 140 in a manner different from an authorized user of the user device. For example, a group of normal operation metrics may correspond to a range of typing speeds as determined in the first time period. The second operation metrics may be determined as anomalous if typing speed(s) determined in the second time period fall outside the range of typing speeds as determined in the first time period. In addition, at step 228, the security platform 110 may determine whether an available balance for the card exceeds the transaction value.

At step 232, and if the second operation metrics are determined to be anomalous and/or the available balance is less than the transaction value, the authentication platform 110 may decline the authorization request. The authentication platform 110 may send an indication declining the authorization request to the card payment infrastructure 160. At step 236, and in response to the receiving the indication from the authentication platform 110, the card payment infrastructure 160 may not process the transaction and send an indication declining the transaction to the payment interface platform 155 and/or the user device 140.

In an arrangement, other parameters associated with the user may be used (in addition to or instead of operation metrics) for grouping by the clustering algorithm. The other parameters may comprise an account balance, average credit utilization per day or average credit utilization per week, merchants/websites (e.g., MCCs) at which purchases are made, and/or the like. If the machine learning model is trained (e.g., at step 208) using data from a plurality of individuals, the plurality of individuals may comprise individuals with a same account period (e.g., a time period since the individuals opened the account), location, total available credit, and/or average credit utilization as the user corresponding to the card being used for the transaction.

If the authentication platform 110 approves the authorization request as received from the card payment infrastructure 160, the authentication platform 110 may send an indication of approval to the card payment infrastructure 160. The authentication platform 110 may approve the authorization request if the second operation metrics are not anomalous with respect to the first operation metrics and if the transaction value is less than the available balance. The second operation metrics may be determined to be not anomalous, for example, if the second operation metrics are within the groups determined by the clustering algorithm (e.g., at step 208). For example, the measurement may be determined to be within the group if the distance(s) between the second operation metrics and core point(s) associated with the group(s) is/are less than (or equal to) the threshold value. The card payment infrastructure 160 may process the transaction (e.g., transfer funds to the merchant account) and send an indication of approval to the payment interface platform 155 based on the indication of approval.

In an arrangement, the authentication platform 110 may not be associated with an in issuing bank of the credit/debit card being used for the transaction. In this scenario, the user device 140 may send the second operation metrics during the initiation of the card-based transaction (e.g., at step 212). The user device 140 may send the second operation metrics, for example, when a payment interface is displayed at the user device 140, when credit-card details are being entered at the user device 140 via a user interface, when a purchase button is pressed via a user interface as displayed by a merchant website, when a check-out page is displayed at the user device 140, and/or the like. Based on the second operation metrics, the authentication platform 110 may determine whether to allow or deny the transaction. If the authentication platform 110 determines that the second operation metrics are anomalous with respect to a determined machine learning model, the authentication platform may send an indication, to the user device 140, to disallow the transaction. Based on receiving the indication, the user device 140 may redirect the device away from the payment interface or merchant website.

Figure 3:
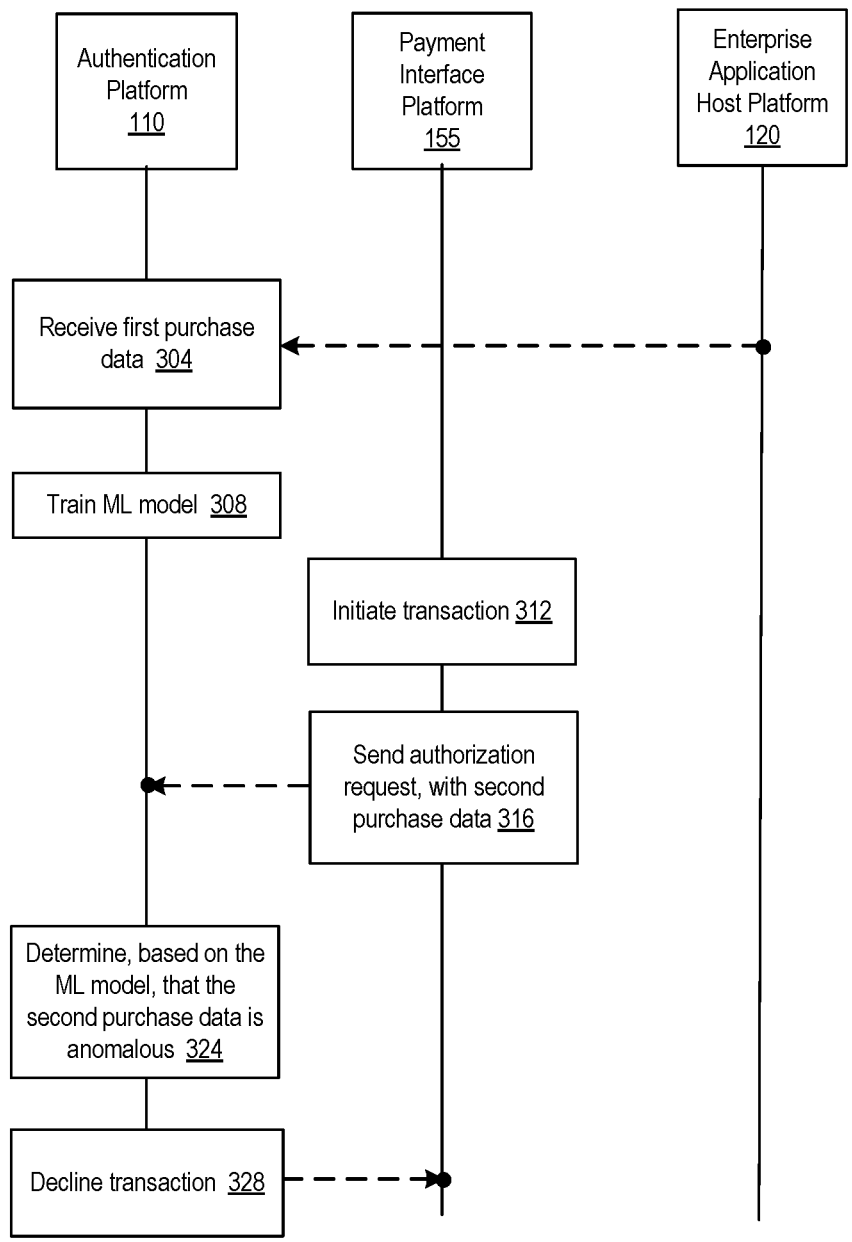
FIG. 3 shows an illustrative event sequence for authenticating a transaction, in accordance with one or more example arrangements.

FIG. 3 shows an illustrative event sequence for authenticating a payment. The payment may be a credit/debit card transaction (e.g., via a payment interface/portal on a website or a smartphone application) initiated via the user device 140. The payment may be a cash or card-based transaction as input at a PoS device at a physical retail location of the merchant. With respect to the event sequence of FIG. 3, the authentication platform 110 may be associated with the merchant or a service provider providing authentication services for the merchant.

At step 304, the authentication platform 110 may receive, from the enterprise application host platform 140, first purchase data of a user. In other arrangements, the first purchase data may be stored in the database 170-2 of the authentication platform 170-2. The first purchase data may comprise data corresponding to historical purchases made by the user. The first purchase data may comprise one or more of: purchase values, items purchased, purchase locations (e.g., physical retail location address), time/days of purchase, payment methods (e.g., cash, credit card, or debit card, etc.). If a payment method is a card-based payment at a physical retail location, the first purchase data may additionally comprise an indication of whether the payment was made using a chip on the card, using a magnetic strip on the card, or using an NFC-based method (e.g., if the card is NFC-enabled, or via a smart-phone). The first purchase data may correspond to purchases over a first time period. The first time period may be an extended time period (e.g., a few/several days, weeks, and/or months). In an arrangement, the first purchase data may comprise purchase data corresponding to a plurality of individuals at a purchase location (e.g., a physical retail location).

At step 308, the authentication platform 110 may train a machine learning model based on the first purchase data. For example, the authentication platform 110 may use a clustering algorithm to categorize/group the first purchase data (e.g., received at step 304) into one or more groups. The one or more groups may be categorized as normal purchase data. The clustering algorithm may comprise one or more of hierarchical clustering, centroid based clustering, density based clustering, and/or distribution based clustering.

Grouping of normal measurements may enable the authentication platform 110 to categorize/determine purchase data that corresponds to purchases made over the first time period as normal and non-anomalous. The machine learning model may be associated with an identifier of the user (e.g., user identifier, user phone number), a credit/debit card number of the user, and/or the purchase location (e.g., the physical retail location address). The authentication platform 110 may store the machine learning model 110 in the database 170-2.

At step 312, a user may initiate a transaction (e.g., credit card/debit card payment, cash payment to a merchant) via the payment interface platform 155. The payment interface platform 155 may be a PoS device at a physical retail location of the merchant. For example, the user or a store employee may scan the items at the PoS device and initiate the transaction by selecting a check-out button on the PoS device. If the payment is an online payment for a web-based purchase, the payment interface platform 155 may provide a payment interface on the user device 140 for initiating a transaction. The payment interface may be provided via a web page or an application associated with an online merchant, and displayed on the user device 140. The transaction may be initiated by the user by clicking on a purchase button or a check-out button at the payment interface as displayed on the user device.

At step 316, the payment interface platform 155 may send an authorization request to the authentication platform 110. The authorization request may comprise second purchase data associated with the transaction. The second purchase data may comprise a purchase value of the second transaction, items purchased, a purchase location, a time/day of purchase, a payment method (e.g., cash, credit card, or debit card, etc.). If the payment method for the transaction is a card-based payment at a physical retail location, the second purchase data may additionally comprise an indication of whether the transaction is being paid for using chip on the card, using a magnetic strip on the card, or using an NFC-based method (e.g., using the card or a smart-phone with NFC capabilities).

At step 324, the security platform 110 may determine, based on the machine learning model as trained at step 308, whether the second purchase data is anomalous with respect to the first purchase data. The machine learning model may be retrieved (e.g., from the database 170-2) based on the identifier of the user (e.g., user identifier, user phone number), the credit/debit card number used for the transaction, and/or the purchase location (e.g., a physical retail location address). The second purchase data may be determined to be anomalous, for example, if the second purchase data falls outside the groups determined by the clustering algorithm (e.g., at step 308). The second purchase data may be determined to be outside the group if the distance(s) between the second purchase data and core point(s) associated with the group(s) is/are greater than a threshold value. For example, a group based on the normal purchase data may correspond to a range of purchase values and frequent purchase locations made by the user in the first time period. The second purchase data may be determined as anomalous if a purchase value of the second transaction is outside the range of purchase values and/or a location of the second transaction is not among the frequent purchase locations.

At step 328, and if the second purchase data is determined to be anomalous, the authentication platform 110 may decline the authorization request. The authentication platform 110 may send an indication declining the authorization request to the payment interface platform 155. If the payment interface platform 155 is a PoS device, the payment interface platform may display an indication declining the transaction. If the payment interface platform 155 is providing a payment interface on the user device 140 for an online payment, the payment interface platform 155 may send an indication declining the transaction to the user device 140.

If the authentication platform 110 approves the authorization request as received from the payment interface platform 155, the authentication platform 110 may send an indication of approval to the payment interface platform 155. The payment interface platform 155 may process the transaction (e.g., using the card payment infrastructure 160).

Figure 4:
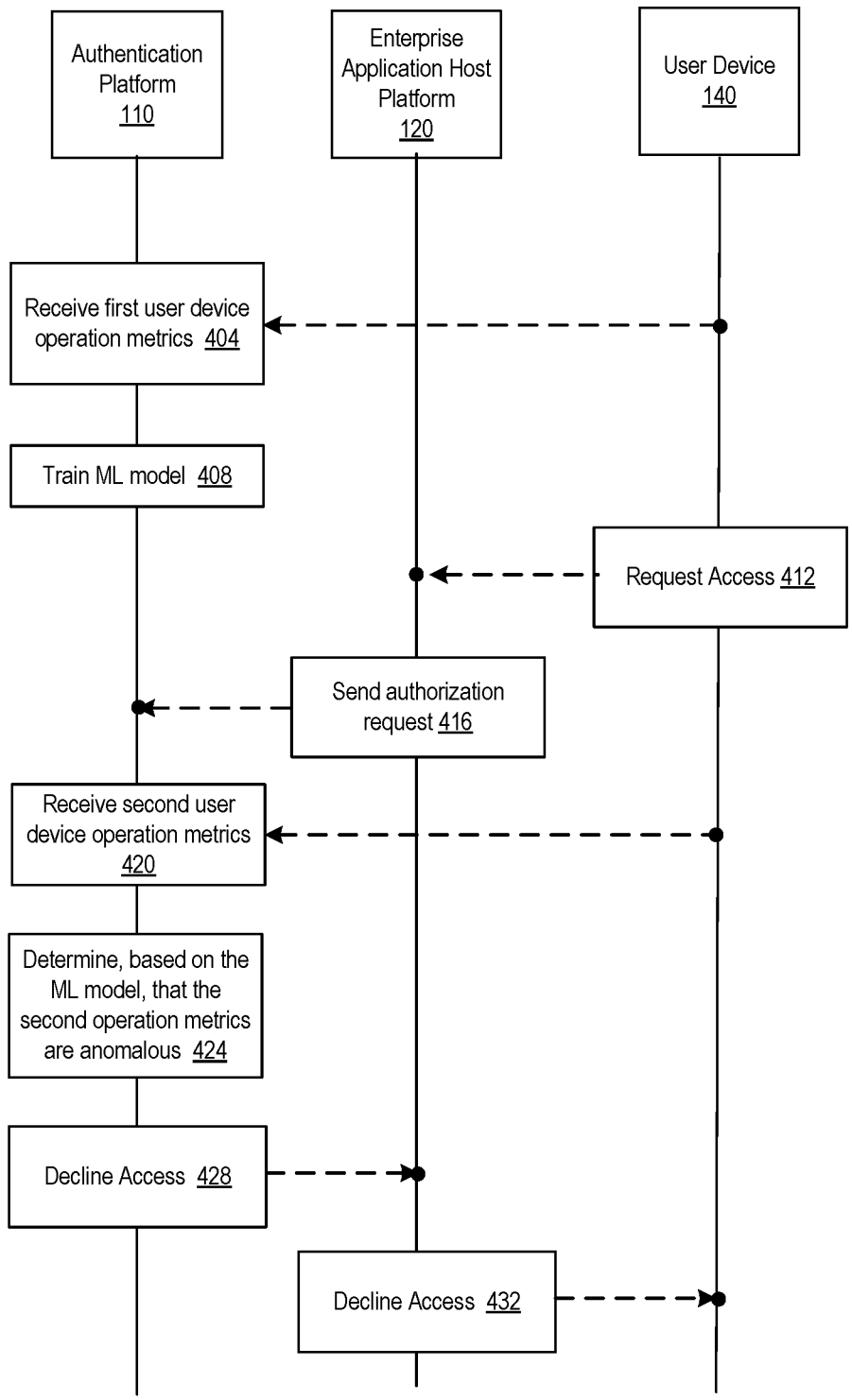
FIG. 4 shows an illustrative event sequence for access control of computing assets, in accordance with one or more example arrangements.

FIG. 4 shows an illustrative event sequence for access control of computing assets. The computing assets may be in a private network (e.g., the private network 130). The computing assets may be connected to a public network (e.g., the public network 135). The computing assets may be one or more of devices, systems, applications, databases, and/or the like. For example, the access control may be implemented such that a user of the user device 140 (or the enterprise user device 115), may authenticate and secure access to the enterprise application host platform 120. As another example. the access control may be implemented such that a user of the user device 140, may authenticate and secure access to an application (e.g., a corporate email application, an online banking application) hosted by the enterprise application host platform 120.

At step 404, the authentication platform 110 may receive, from the user device 140 of a user, first operation metrics of the user device 140. The first operation metrics may comprise one or more of: measurements relating to an angle of the user device 140 with respect to ground, an indication of whether the user device is being held with a left hand or a right hand, a typing speed at an interface (e.g., virtual or physical keyboard of the user device 140), websites visited, smartphone applications used/download, and/or the like. In an arrangement, the measurements relating to an angle of the user device may be determined by gyroscopes and/or accelerometers integrated with the user device 140. In an arrangement, data received from a rear-facing camera may be used to determine whether the user device is being held with a left hand or a right hand (e.g., the camera, due to its location on the user device 140, may be obscured if being held with a right hand, and not obscured if being held with the left hand). Operation metrics may be determined by special purpose software installed on the user device 140 for authentication of online payments. The special purpose software may gather the first user operation metrics. The first operation metrics may correspond to operation metrics measured over a first time period. The first operation metrics may correspond to operation metrics intermittently measured over a first time period (e.g., every few seconds, few minutes, few hours, etc.). The first time period may be an extended time period (e.g., a few/several days, weeks, and/or months).

The authentication platform 110 may use the received first operation metrics as training data for training a machine learning model for identifying anomalous operation metrics. In an arrangement, the training data may be stored in the database 170-2. In an arrangement, the database 170-2 may store operation metrics of user devices corresponding to a plurality of individuals.

At step 408, the authentication platform 110 may train a machine learning model based on the first operation metrics. For example, the authentication platform 110 may use a clustering algorithm to categorize/group the first operation metrics (e.g., received at step 404) into one or more groups. The one or more groups may be categorized as normal operation metrics. The clustering algorithm may comprise one or more of hierarchical clustering, centroid based clustering, density based clustering, and/or distribution based clustering. Grouping of normal measurements may enable the authentication platform 110 to categorize/determine operation metrics that corresponds to general operation of the user device 140 over the first time period as normal and non-anomalous. The machine learning model may be associated with an identifier of the user (e.g., employee code, device code associated with the user device 140, email address, any other identifier, etc.). The authentication platform 110 may store the machine learning model in the database 170-2.

At step 412, the user may request access to one or more computing assets of the private network 130. The user device 140 may send a request to access the one or more computing assets of the private network to, for example, the enterprise application host platform 412. In an arrangement, the user device 140 may send the user request to the authentication platform. For example, the user may input user credentials (e.g., user name, password) via an interface of the user device 140 to login to a corporate email account, access a computing application remotely hosted on the enterprise application host platform 120, access an account associated with a service (e.g., a banking account), access a database connected to the private network 130, and/or the like. As another example, the user may request to connect to one or more services provided by the devices, systems, and/or application in the private network 130. The request may comprise the user credentials as input at the user device 140. The user device 140 may hash and send the credentials as part of the request. The request may further comprise an identifier of the user (e.g., employee code, device code associated with the user device 140, email address, any other identifier, etc.).

At step 416, the enterprise application host platform 110 may send an authorization request 416 to the authentication platform 110. The authorization request may comprise at least a part of the information in the request at step 412 (as received from the user device 140). For example, the enterprise application host platform 110 may send the hashed user credentials to the authentication platform 110 for verification. The authorization request may further comprise an identifier of the user (e.g., employee code, device code associated with the user device 140, email address, any other identifier, etc.).

At step 420, and in response to receiving the authorization request, the authentication platform 110 may request and receive second operation metrics of the user device 140. The authentication platform 110 may determine the user device 140 (e.g., cell phone number of the user device 140, an identifier of the user device 140), for example, based on the identifier of the user (e.g., employee code, device code associated with the user device 140, email address, any other identifier, etc.). The authentication platform 110 may store (e.g., in the database 170-2) an association between the identifier of the user and the cell phone number/identifier of the user device 140. Based on querying the database 170-2, the authentication platform 110 may determine the user device 140 and request the second operation metrics from the user device 140.

The second operation metrics may comprise one or more of: measurements relating to an angle of the user device 140 with respect to the ground, an indication of whether the user device is being held with a left hand or a right hand, a typing speed at an interface (e.g., virtual or physical keyboard of the user device 140), websites visited, smartphone applications used/download, and/or the like. The second operation metrics may correspond to operation metrics measured over a second time period. The second operation metrics may correspond to operation metrics intermittently measured over a second time period (e.g., every few seconds, few minutes, etc.). The second time period may be a time period that is shorter than the first time period (e.g., a few minutes, hours, days, etc.). The second time period may correspond to a time period immediately preceding the sending of the request (e.g., step 412).

At step 424, the security platform 110 may determine whether the second operation metrics are anomalous with respect to the first operation metrics. The second operation metrics may be determined to be anomalous, for example, if the second operation metrics fall outside the groups determined by the clustering algorithm (e.g., at step 408). For example, the measurement may be determined to be outside the group if the distance(s) between the second operation metrics and core point(s) associated with the group(s) is/are greater than a threshold value. The security platform 110 may retrieve the stored machine learning model (e.g., from the database 170-2) based on the identifier of the user and use to stored machine learning model for the clustering analysis at step 424.

The second operation metrics may be anomalous with respect to the first operation metrics because a user who may have illicitly obtained access to the user device 140 may interact with the user device 140 in a manner different from an authorized user of the user device. For example, a group of normal operation metrics may correspond to a range of typing speeds as determined in the first time period. The second operation metrics may be determined as anomalous if typing speed(s) determined in the second time period fall outside the range of typing speeds as determined in the first time period. In addition, at step 424, the security platform 110 may determine whether the hashed user credentials are valid. For example, the database 170-2 may store hashed values of the user credentials, and compare the stored hash values with hash values received at step 416.

At step 428, and if the second operation metrics are determined to be anomalous and/or the stored hash values do not match the hash values received at step 416, the authentication platform 110 may decline the authorization request. The authentication platform 110 may send an indication declining the authorization request to the enterprise application host platform 120. At step 432, and in response to the receiving the indication from the authentication platform 110, the enterprise application host platform 120 may send an indication declining access to the one or more computing assets of the private network 130.

If the authentication platform 110 approves the authorization request as received from the enterprise application host platform 120, the authentication platform 110 may send an indication of approval to the enterprise application host platform 120. The authentication platform 110 may approve the authorization request if the second operation metrics are not anomalous with respect to the first operation metrics and if the stored hash values do not match the hash values received at step 416. The second operation metrics may be determined to be not anomalous, for example, if the second operation metrics are within the groups determined by the clustering algorithm (e.g., at step 408). For example, the measurement may be determined to be within the group if the distance(s) between the second operation metrics and core point(s) associated with the group(s) is/are less than (or equal to) the threshold value. The enterprise application host platform 120 may enable access to the one or more computing assets, via the user device 140, based on receiving the indication of approval.

Figure 5:
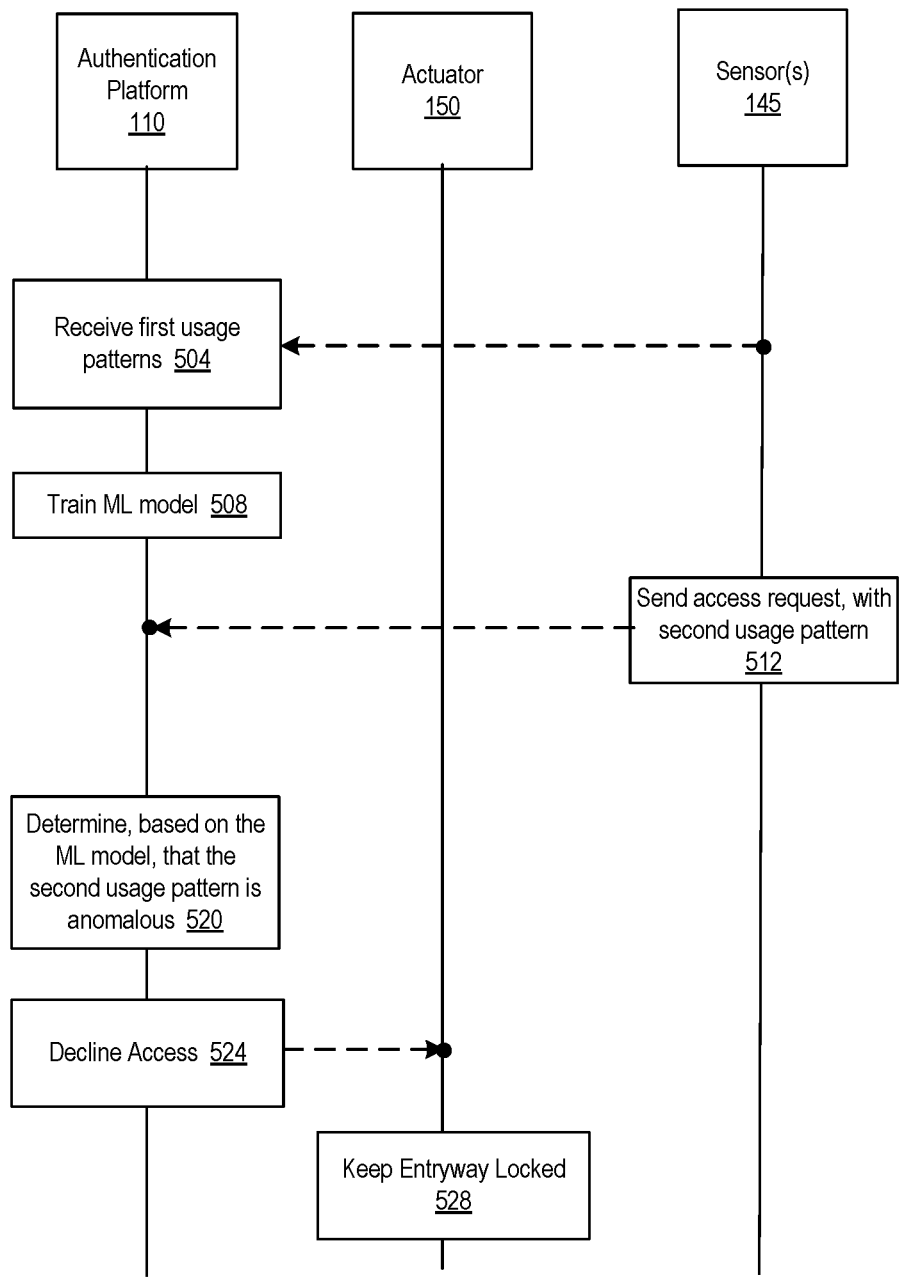
FIG. 5 shows an illustrative event sequence for user authentication to control access to a physical location, in accordance with one or more example arrangements.

FIG. 5 shows an illustrative event sequence for user authentication to control access to a physical location. The physical location may be an office space that is secured via a card-scanning device and actuators (e.g., actuator 150) controlling a lock to a door (e.g., locking or unlocking the door). The actuator 150 may be configured to unlock the door based on the card-scanning device detecting an authorized access card. The access card may be an NFC/RFID-enabled device, from which data (e.g., an access code) may be wirelessly retrieved by the card scanning device. The card scanning device may be a sensor (e.g., the sensor 145) configured to wirelessly read an access code as stored on the access card. The sensor 145 may be an NFC/RFID scanner that may read the access code stored on the card (e.g., via an NFC/RFID protocol), and cause sending of a signal to the actuator 150 (e.g., to release the locks) based on the access code being an authorized access code.

At step 504, the authentication platform 110 may receive, from the sensors 145, first usage patterns of a user. In other arrangements, the first usage patterns may be stored in the database 170-2 of the authentication platform 170-2. The first usage patterns may comprise data corresponding to historical usage of an access card, associated with the user, at one or more sensors of an office space corresponding to an enterprise application. The sensors 145 may comprise NFC/RFID sensors, motion sensors, cameras, receiver coils, and/or the like that may record a motion pattern of an access card when being used by a user to secure entry into an office space. The first usage patterns may comprise one or more of: motion patterns of an access card (e.g., as recorded by cameras and/or motion sensors) when the access card is being used by the user to enter the office space, received signal strengths as recorded by the NFC/RFID sensor/receiver (e.g., a received signal strength vs time plot) when the access card is being used by the user to enter the office space, a received signal strength as measured by a receiver coil (e.g., a received signal strength vs time plot) when the access card is being used by the user to enter the office space, and/or the like. The first usage patterns may correspond to card usage over a first time period. The first time period may be an extended time period (e.g., a few/several days, weeks, and/or months). The first usage patterns only comprise usage patterns for instances where the access card successfully secures entry for the user (e.g., the access code is an authorized access code).

At step 508, the authentication platform 110 may train a machine learning model based on the first usage patterns. For example, the authentication platform 110 may use a clustering algorithm to categorize/group the first usage patterns (e.g., received at step 504) into one or more groups. The one or more groups may be categorized as normal usage patterns. The clustering algorithm may comprise one or more of hierarchical clustering, centroid based clustering, density based clustering, and/or distribution based clustering. Grouping of normal measurements may enable the authentication platform 110 to categorize/determine usage patterns that corresponds to office entries made over the first time period as normal and non-anomalous. The machine learning model may be associated with an identifier of the user (e.g., an employee identifier, an access card identifier, an access code associated with the card). The authentication platform 110 may store the machine learning model 110 in the database 170-2.

At step 512, a user may request access to the office space by scanning the access card at the sensor 145. Based on scanning the access card, the sensor 145 may send an access request to the authentication platform 110. The access request may comprise second usage pattern as measured by the sensor 145. The second usage pattern may comprise one or more of: a motion pattern of the access card (e.g., as recorded by a camera), a received signal strength as recorded by the NFC/RFID sensor (e.g., a signal strength vs time plot), a received signal strength as measured by the receiver coil (e.g., a signal strength vs time plot), and/or the like. The access request may further comprise an access code, as measured by the sensor 145, stored in the access card.

At step 520, the security platform 110 may determine, based on the machine learning model as trained at step 508, whether the second usage pattern is anomalous with respect to the first usage patterns. The machine learning model may be retrieved (e.g., from the database 170-2) based on the identifier of the user. The second usage pattern may be determined to be anomalous, for example, if the second usage pattern falls outside the groups determined by the clustering algorithm (e.g., at step 508). The second usage pattern may be determined to be outside the group if the distance(s) between the second usage patterns and core point(s) associated with the group(s) is/are greater than a threshold value.

For example, an authorized user may generally scan the access card by moving it across the sensor 145, which may result in signal strength vs time plots that show an increasing signal strength and a short peak, followed by a decreasing signal strength. A group based on the normal usage patterns may correspond to such signal strength vs time plots. However, an unauthorized user (e.g., who may have stolen the access card) may hold up the access card against the sensor 145, which may result in a signal strength vs time plot showing a constant signal strength. The second usage patterns may be determined as anomalous based on this distinction between the signal vs time plots embodied in the group and the signal vs time plot as embodied in the second usage pattern.

The security platform 110 may further determine whether an access code as read from the access card matches authorized access codes (e.g., as stored in the database 170-2).

At step 524, and if the second usage pattern is determined to be anomalous and/or if the access code does not match an authorized access code, the authentication platform 110 may decline the authorization request. The authentication platform 110 may send an indication to the actuator 150 to keep the door locked based on the second usage pattern being anomalous. At step 528, the actuator 150 may keep the door locked based on receiving the indication. The authentication platform 110 may send an indication to a computing device (e.g., associated with a security personnel) based on the second usage pattern being anomalous. The authentication platform 110 may not send any indication to the actuator 150 (e.g., thereby keeping the door locked) based on the second usage pattern being anomalous.

If the second usage pattern is determined to be not anomalous and if the access code matches an authorized access code, the authentication platform 110 may approve the authorization request. The second usage pattern may be determined to be not anomalous, for example, if the second usage pattern falls within the groups determined by the clustering algorithm (e.g., at step 508). The second usage pattern may be determined to be within the group if the distance(s) between the second usage pattern and core point(s) associated with the group(s) is/are less than (or equal to) a threshold value. The authentication platform 110 may send an indication to the actuator 150 to unlock the door based on the second usage pattern being non-anomalous.

Figure 6:
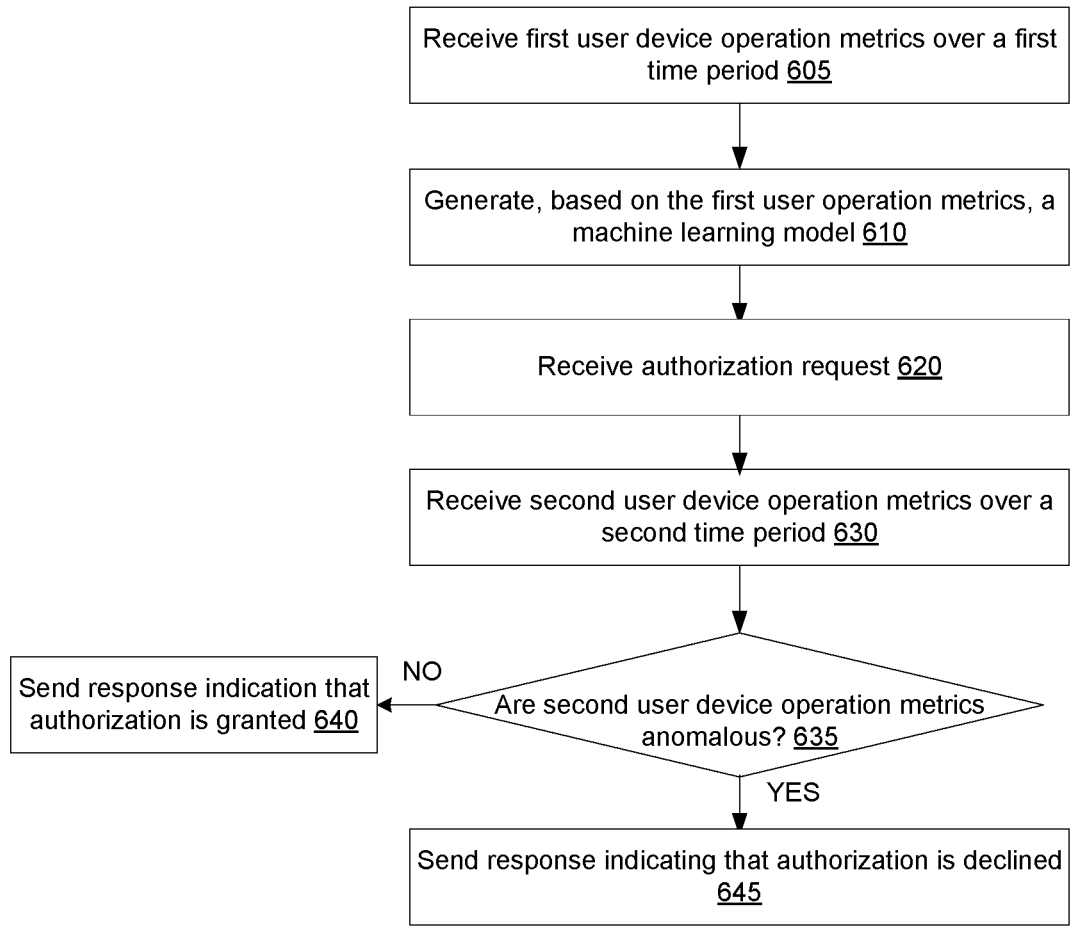
FIG. 6 shows an example algorithm for user authentication, in accordance with one or more example arrangements.

FIG. 6 shows an example algorithm for user authentication. The user authentication may be for online payment transactions (e.g., as described with respect to FIG. 2). The user authentication may be for controlling user access to computing resources/assets (e.g., as described with respect to FIG. 4). The example algorithm may be performed at the security platform 110.

At step 605, the authentication platform 110 may receive (e.g., from the user device 140 of a user), first operation metrics of the user device 140. The first operation metrics may relate to user interaction with/user operation of the user device 140. The first operation metrics may correspond to operation metrics intermittently measured over a first time period.

At step 610, the authentication platform 110 may train a machine learning model based on the first operation metrics. For example, the authentication platform 110 may use a clustering algorithm to categorize/group data points corresponding to the first operation metrics (e.g., received at step 605) into one or more groups. The one or more groups may be categorized as normal operation metrics.

At step 620, the authentication platform 110 may receive an authorization request (e.g., from the user device 140). The authorization request may be a request for approving an online payment transaction being performed via the user device 140. In another arrangement, the authorization request may be a request for accessing computing resources via the user device 140.

At step 630, the authentication platform may receive second operation metrics of the user device 140. The second operation metrics may relate to user interaction with/user operation of the user device 140. The second operation metrics may correspond to operation metrics intermittently measured over a second time period. The second time period may be a time period immediately preceding the sending of the authorization request by the user device 140. The second time period may be less than the first time period.

At step 635, the authentication platform 140 may determine, based on the machine learning model, whether the second operation metrics are anomalous. Determining whether the second operation metrics are anomalous may comprise determining whether data points corresponding to the second operation metrics are outside the one or more groups.

At step 645, and if the second operation metrics are determined to be anomalous, the authentication platform 140 may send an indication declining the authorization request. If the authorization request was for processing an online payment transaction, the indication declining the authorization request may be sent to the user device 140 and/or the card payment infrastructure 160. If the authorization request was for accessing computing resources, the indication declining the authorization request may be sent to the user device 140 and/or the enterprise application host platform 120.

At step 640, and if the second operation metrics are determined to be not anomalous, the authentication platform 140 may send an indication approving the authorization request. If the authorization request was for processing an online payment transaction, the indication approving the authorization request may be sent to the user device 140 and/or the card payment infrastructure 160. Based on receiving the authorization request, the card payment infrastructure 160 may process the payment transaction. If the authorization request was for accessing computing resources, the indication approving the authorization request may be sent to the user device 140 and/or the enterprise application host platform 120. Based on receiving the authorization request, the enterprise application host platform 120 may enable access to the computing resources.

Figure 7:
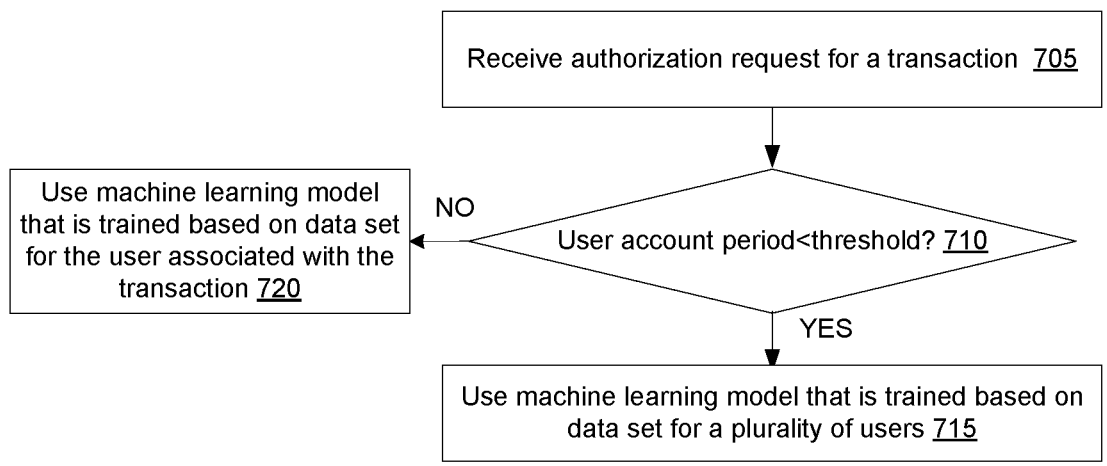
FIG. 7 shows an example algorithm for determining a machine learning model to use for processing/approving a transaction, in accordance with one or more example arrangements.

FIG. 7 shows an example algorithm for determining a machine learning model to use for processing/approving a transaction. The transaction may be a payment at a physical retail location. The example algorithm may be used for selecting a machine learning model to be used at step 324 of FIG. 3.

At step 705, the authentication platform 110 may receive an authorization request for a payment transaction (e.g., at a physical retail location) by a user. The payment transaction may be, for example, a card-based or cash-based purchase at the physical retail location. The authorization request may comprise a user identifier associated with the user (e.g., a customer number, phone number, customer code, credit/debit card number) and a transaction value.

The authentication platform 110 may have a database comprising a plurality of user identifiers (e.g., corresponding to users who may have made transactions at one or more physical retail locations). Each of the plurality of user identifiers may be associated with a corresponding machine learning model trained based on historical purchase data for that user identifier. Each of the plurality of user identifiers may be further associated with a date corresponding to a first payment transaction associated with that user identifier. The authentication platform 110 may further store machine learning models trained based on purchase data of all transactions made at the physical retail location, purchase data of transactions with similar transaction values made at the physical retail location, etc.

At step 710, the authentication platform 110 may determine whether a user account period of the user (making the purchase) is less than a threshold time period. The user account period may be a time period between a first payment transaction made by the user and the date of the payment transaction corresponding to step 705.

At step 715, and if the user account period is less than the threshold time period, the authentication platform 110 may use a machine learning model generated based on purchase data of a plurality of users. For example, the authentication platform 110 may use a machine learning model generated based on purchase data of all transactions made at the physical retail location. As another example, the authentication platform 110 may use a machine learning model generated based on purchase data of transactions with a transaction value same as the transaction value for which the authentication request was received. This enables the use an appropriate machine learning model even if there is not sufficient data available to train a machine learning model (e.g., to a required level of accuracy) for the user.

At step 720, and if the user account period is greater than (or equal to) the threshold time period, the authentication platform 110 may use a machine learning model generated based on historical purchase data for the user. The authentication platform 110 may retrieve the machine learning model from the database based on the user identifier.

Figure 8:
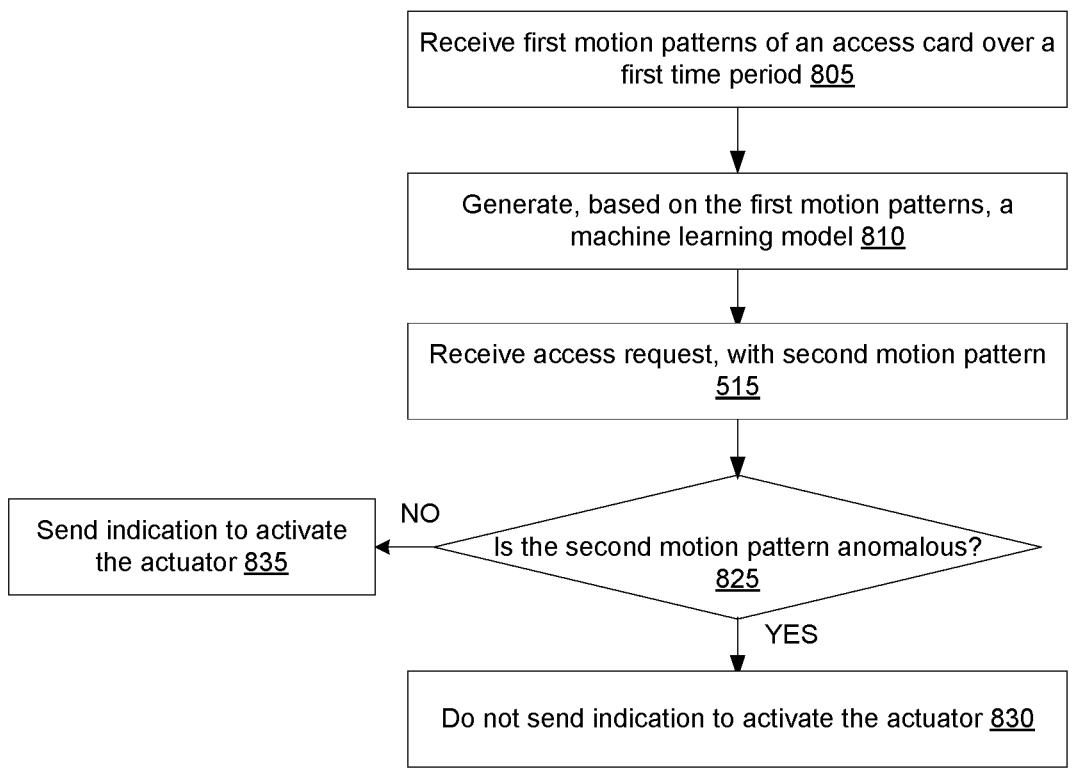
FIG. 8 shows an example algorithm for user authentication in accordance with one or more example arrangements.

FIG. 8 shows an example algorithm for user authentication. The user authentication may be for controlling user access to a physical location via an access card (e.g., as described with respect to FIG. 5). The example algorithm may be performed at the security platform 110.

At step 805, the authentication platform 110 may receive (e.g., from the sensors 145), first motion patterns of the access card as made by a user. The first motion patterns may relate to motion of the access card in the proximity of the sensors 145. The first motion patterns may correspond to motion patterns measured over a first time period and may correspond to a plurality of successful uses of the access card for securing entry to the physical location.

At step 810, the authentication platform 110 may train a machine learning model based on the first motion patterns. For example, the authentication platform 110 may use a clustering algorithm to categorize/group data points corresponding to the first motion patterns (e.g., received at step 805) into one or more groups. The one or more groups may be categorized as normal motion patterns.

At step 815, the authentication platform 110 may receive an access request (e.g., from a sensor 145). The access request may be a request for access to an office space controlled by the actuator 150 (which may have secured/locked a door). The access request may comprise a second motion pattern of the access card. The second motion pattern may relate to motion of the access card in the proximity of the sensors 145.

At step 825, the authentication platform 140 may determine, based on the machine learning model, whether the second motion pattern is anomalous. Determining whether the second motion pattern is anomalous may comprise determining whether data points corresponding to the second motion pattern are outside the one or more groups.

At step 830, and if the second motion pattern is determined to be anomalous, the authentication platform 140 may not send an indication to activate the actuator 830. This may result in the door remaining locked. At step 835, and if the second motion pattern is determined to be non-anomalous, the authentication platform 140 may send an indication to activate the actuator 830. This may result in the door becoming unlocked (e.g., a locking mechanism may be released), granting access to the user.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for access control, the system comprising:
   a sensor configured to wirelessly scan an access card;
   a camera;
   an actuator controlling a locking mechanism; and
   an authentication platform communicatively in communication with the sensor and the actuator, the authentication platform comprising:
   at least one processor; and
   memory storing computer-readable instructions that, when executed by the at least one processor, cause the authentication platform to:
   receive, from the camera, first usage patterns of the access card, wherein the first usage patterns correspond to historical use of the access card, and wherein the first usage patterns comprise first motion patterns of the access card, as captured by the camera, while the access card is being wirelessly scanned by the sensor;
   perform cluster analysis on the first usage patterns to determine groups of normal usage patterns;
   receive, from the camera, a second usage pattern of the access card, wherein the second usage pattern comprises a second motion pattern of the access card, as captured by the camera, while the access card is being wirelessly scanned by the sensor for generating an access request;

determine, based on the groups of normal usage patterns and the second usage pattern, that the second motion pattern of the access card is non-anomalous; and based on the determining that the second motion pattern of the access card is non-anomalous, send an indication to activate the actuator, wherein the indication to activate the actuator causes the locking mechanism to release.

2. The system of claim 1, wherein the sensor comprises a radio frequency identification (RFID) sensor.

3. The system of claim 1, wherein the access card stores an access code, wherein the access card being wirelessly scanned comprises access card being wirelessly scanned for determining the access code, and wherein the computer-readable instructions, when executed by the at least one processor, cause the authentication platform to send the indication to activate the actuator based on the access code being an authorized access code.

4. The system of claim 3, wherein the system further comprises a radio frequency identification (RFID) sensor configured to scan the access card to determine the access code.

5. The system of claim 1, wherein the computer-readable instructions, when executed by the at least one processor, cause the authentication platform to determine that the second motion pattern is non-anomalous based on determining that distances between the second usage pattern and core points associated with the groups are less than a threshold value.

6. The system of claim 1, wherein the computer-readable instructions that, when executed by the at least one processor, cause the authentication platform to perform the cluster analysis using a clustering algorithm, wherein the clustering algorithm comprises one or more of hierarchical clustering, centroid based clustering, density based clustering, or distribution based clustering.

7. A method for access control, the method comprising
receiving, from a camera, first usage patterns of an access card, wherein the first usage patterns correspond to historical use of the access card, and wherein the first usage patterns comprise first motion patterns of the access card, as captured by the camera, while the access card is being wirelessly scanned by a sensor;

performing cluster analysis on the first usage patterns to determine groups of normal usage patterns;

receiving, from the camera, a second usage pattern of the access card, wherein the second usage pattern comprises a second motion pattern of the access card, as captured by the camera, while the access card is being wirelessly scanned by the sensor for generating an access request;

determining, based on the groups of normal usage patterns and the second usage pattern, that the second motion pattern of the access card is non-anomalous; and based on the determining that the second motion pattern of the access card is non-anomalous, sending an indication to activate an actuator controlling a locking mechanism, wherein the indication to activate the actuator causes the locking mechanism to release.

8. The method of claim 7, wherein the sensor is a radio frequency identification (RFID) sensor.

9. The method of claim 7, wherein the access card stores an access code, wherein the access card being wirelessly scanned comprises access card being wirelessly scanned for determining the access code, and wherein the sending the indication to activate the actuator is further based on the access code being an authorized access code.

10. The method of claim 9, further comprising receiving, from a radio frequency identification (RFID) sensor, the access code stored in the access card.

11. The method of claim 7, wherein the determining that the second motion pattern is non-anomalous is based on determining that distances between the second usage pattern and core points associated with the groups are less than a threshold value.

12. The method of claim 7, wherein the performing the cluster analysis comprises performing one or more of: hierarchical clustering, centroid based clustering, density based clustering, or distribution based clustering.

13. A non-transitory computer readable medium storing computer executable instructions that, when executed by a processor, cause an authentication platform to:
receive, from a camera, first usage patterns of an access card, wherein the first usage patterns correspond to historical use of the access card, and wherein the first usage patterns comprise first motion patterns of the access card, as captured by the camera, while the access card is being wirelessly scanned by a sensor;

perform cluster analysis on the first usage patterns to determine groups of normal usage patterns;

receive, from the camera, a second usage pattern of the access card, wherein the second usage pattern comprises a second motion pattern of the access card, as captured by the camera, while the access card is being wirelessly scanned by the sensor for generating an access request;

determine, based on the groups of normal usage patterns and the second usage pattern, that the second motion pattern of the access card is non-anomalous; and based on the determining that the second motion pattern of the access card is non-anomalous, send an indication to activate an actuator controlling a locking mechanism, wherein the indication to activate the actuator causes the locking mechanism to release.

14. The non-transitory computer readable medium of claim 13, wherein the sensor comprises a radio frequency identification (RFID) sensor.

15. The non-transitory computer readable medium of claim 13, wherein the access card stores an access code, wherein the access card being wirelessly scanned comprises access card being wirelessly scanned for determining the access code, and wherein the computer executable instructions, when executed by a processor, cause the authentication platform to send the indication to activate the actuator further based on the access code being an authorized access code.

16. The non-transitory computer readable medium of claim 15, wherein the computer executable instructions, when executed by a processor, cause the authentication platform to receive, from a radio frequency identification (RFID) sensor, the access code stored in the access card.

17. The non-transitory computer readable medium of claim 13, wherein the computer executable instructions, when executed by a processor, cause the authentication platform to determine that the second motion pattern is non-anomalous based on determining that distances between the second usage pattern and core points associated with the groups are less than a threshold value.

* * * * *